Sept. 12, 1933.   G. G. OBERFELL ET AL   1,926,170
METHOD OF GAS MANUFACTURE
Filed May 24, 1928.

INVENTOR
G. G. Oberfell &
BY R. W. Thomas
Robt. E. Barry
ATTORNEY

Patented Sept. 12, 1933

1,926,170

UNITED STATES PATENT OFFICE 1,926,170

METHOD OF GAS MANUFACTURE

George G. Oberfell and Rosswell W. Thomas, Bartlesville, Okla., assignors to Phillips Petroleum Company, Bartlesville, Okla., a corporation of Delaware Application May 24, 1928. Serial No. 280,336

6 Claims. (Cl. 48—196)

This invention relates to improvements in methods of manufacturing gas and especially to a novel method for utilizing the constituents of natural gas in the manufacture of artificial gas.

The primary object of the invention is to furnish a gas manufacturing system especially suitable for small cities and the like and one in which electrical power may be incidentally generated for use in such cities.

One object is to provide a gas making system in which an internal combustion engine may be incidentally operated for the production of power.

A further object is to provide a novel apparatus for use in the manufacture of artificial gas.

A still further object is to provide a simple and inexpensive system in which artificial gas may be manufactured from gaseous paraffin hydrocarbons, such as butanes, propane, ethane and the like.

With the foregoing objects outlined and with other objects in view which will appear as the description proceeds the invention consists in the novel features hereinafter described in detail, illustrated in the accompanying drawing and more particularly pointed out in the appended claims.

Figure 1:
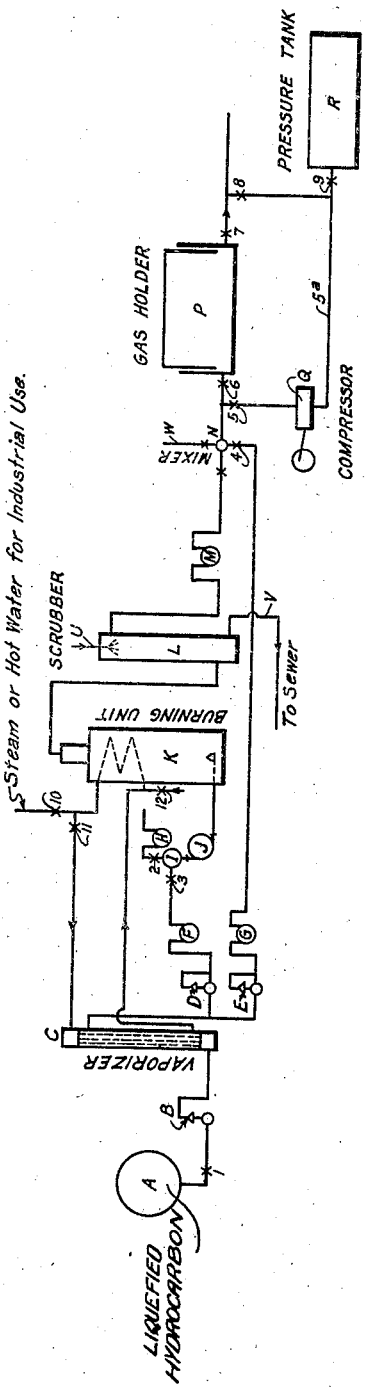
Figure 2:
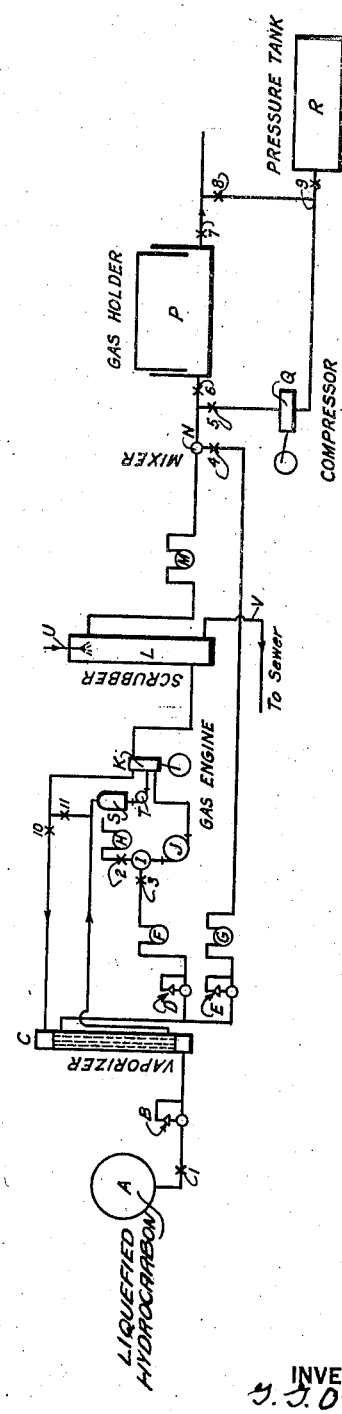

Referring to the drawing Figure 1 is a diagrammatic view in elevation of one form of apparatus suitable for use in this method. Figure 2 is a similar view of a modification.

In the drawing, A designates a storage tank for liquefied petroleum gas or other suitable raw fuel in liquid condition. This tank is connected by a pipe having a valve, 1, to a liquid vaporizer C, and in this pipe a liquid pressure reducing regulator B is interposed. D and E are gas pressure reducing regulators arranged in the branches of a pipe line which leads from the upper portion of the vaporizer C. F and G are gas meters arranged in said branches.

H indicates an air meter through which air is passed on its way through a pipe to the mixing device I. The branch pipe in which the reducing regulator D is arranged, is also connected to said mixing device, and valves 2 and 3 are employed to regulate the quantities of air and vaporized fuel fed to the mixing device. The latter is also connected by a pipe to a blower J, which is connected by a passageway to the retort or steam boiler K. The upper portion of the member K is connected by a pipe line to a wash box or scrubber L. A conduit leads from the upper portion of the part L to a gas meter M and another pipe connects the latter to a mixing chamber N.

P designates a gas holder which is connected by a pipe line having valve 6 to the mixing chamber N. An outlet pipe for the gas holder is provided with valve 7 and the pipes having the valves 6 and 7 are connected by branch pipes, having valves 5 and 8, to a compressed gas line 5$^a$. Q indicates a compressor for compressing gas and feeding the same into the line 5$^a$, and the latter has a valve 9. Pressure tank R communicates with the pipe 5$^a$.

The system shown in Figure 2 is somewhat similar to that shown in Figure 1 but in Figure 2 the part K is formed by an internal combustion engine, and in this figure S indicates a radiator for cooling the engine jacket water. T is a pump for circulating the engine jacket water.

In the process, liquefied petroleum gas is withdrawn from storage tank A through valve 1, thence through liquid pressure regulator B into the vaporizer C where it is put in vapor form. The vapor passes through the gas pressure regulators D and E and from the regulator D, some of it passes through meter F to mixing chamber I, its quantity being controlled by valve 3. Air employed, is introduced through meter H in quantities controlled by valve 2, to mixing chamber I. A mixture of vapor and air passes from mixing chamber I to the blower J which forces the same into the boiler or retort K. As before stated, in Figure 2, the part K is an internal combustion engine. Regardless of the construction of the part K, the products of combustion, such as flue or exhaust gases, pass to scrubber L, in which they are cleaned, cooled and partially dehydrated. From the scrubber the gas passes through the meter M to the mixing chamber N.

The vapors passing through regulator E are metered in G and go to junction point or mixing chamber N in quantity controlled by the valve 4 and in the mixing chamber the vapors are employed to enrich the flue or exhaust gas.

The material leaving the mixing chamber is the finished product and in its gaseous form, it may be passed to city mains or stored in gas holder P, or it may be passed through the pipe having the valve 6 to the compressor Q which functions to store the same in the pressure tank R.

Steam or hot water from the element K is circulated through the vaporizer C by indirect contact to supply latent heat for the vaporization of the liquefied petroleum gas in the vaporizer, the quantity circulated being controlled in the apparatus shown in Figure 1 by valves 10, 11 and 12, and in Figure 2 by valves 10 and 11.

Excess steam or hot water generated in the element K in Figure 1 may be used for industrial purposes or heating. If desired, the power generated in K in Figure 2 may be converted to electricity by any suitable system and fed to transmission lines, thus finding a useful outlet.

Water for cooling, cleaning and dehydrating the exhaust or flue gases is introduced at U into the top of the scrubber L and is removed at the bottom of same through a pipe V and fed to a sewer or the like.

From the foregoing, it will be apparent to those skilled in the art that our improved system provides simple and inexpensive means for manufacturing gas for small cities and the like, and incidentally produces power which may be utilized for various purposes.

If desired, the system may also be modified in such manner as to introduce air through a valved pipe W into the mixing chamber N, in place of the flue or exhaust gas introduced from the scrubber L and in such case a valve may be employed to close the line from the scrubber.

It may be seen from the above description that we have devised a system in which flue or other inert base gases may be carburated or enriched with liquefied petroleum gases or vapors to produce a finished product of any desired commercial calorific value.

Our system may also be employed in a process of carburating air with liquefied petroleum gas or gas vapors to produce a finished commercial gas of any desired calorific value. In either instance, the system will be especially useful for manufacturing gas to be used for small town distribution.

We are aware that various changes may be made in the details disclosed without departing from the scope of the present invention.

What we claim and desire to secure by Letters Patent is:

1. A gas making apparatus including a pressure storage tank for liquid fuel, a vaporizer, a conduit connecting the tank and vaporizer and provided with a pressure reducer, a burning element, means for feeding vaporized fuel from the vaporizer to the burning element, means for transferring heat from the burning element to the vaporizer, a mixing chamber, an indirect heat exchanger including a fluid circulating system connecting the burning element with the vaporizer for conveying substantially inert gas from the burning element to the mixing chamber, means interposed in the last mentioned means for cooling said inert gas on its way to the mixing chamber, and means for conveying vaporized fuel from the vaporizer to the mixing chamber.

2. A gas manufacturing method comprising burning a portion of a paraffin hydrocarbon fuel having boiling points mainly below 34° F. to produce substantially inert gas, utilizing heat from the burning operation to vaporize another portion of said fuel while maintaining the inert gas and fuel out of contact with one another, cooling and partially dehydrating said inert gas, and then enriching said inert gas by mixing the last mentioned portion of said vaporized fuel with the same.

3. A gas manufacturing method comprising burning a paraffin hydrocarbon fuel having boiling points mainly below 34° F. to produce substantially inert gas, transferring heat units from the burning operation to another portion of said fuel by indirect heat exchange for vaporizing said fuel while maintaining the inert gas and fuel out of contact with one another, cooling and partially dehydrating said inert gas, and then enriching said inert gas by mixing the last mentioned portion of said vaporized fuel with the same.

4. A gas manufacturing method comprising flowing a paraffin hydrocarbon fuel having boiling points mainly below 34° F. through a vaporizing zone and therein vaporizing the same, dividing the vaporized flowing fuel leaving said zone into a first stream and a second stream, burning the first stream and thereby producing substantially inert gas and creating heat units, transferring said heat units to the vaporizing zone and thereby vaporizing the first mentioned fuel while maintaining said inert gas and fuel out of contact with one another, cooling and partially dehydrating said inert gas, and then enriching said inert gas by mixing the second stream of vaporized fuel with the same.

5. A gas manufacturing method comprising flowing a paraffin hydrocarbon fuel having boiling points mainly below 34° F. through a vaporizing zone and therein vaporizing the same, dividing the vaporized flowing fuel leaving said zone into a first stream and a second stream, burning the first stream and thereby producing substantially inert gas and creating heat units, transferring said heat units to the vaporizing zone and thereby vaporizing the first mentioned fuel while maintaining said inert gas and fuel out of contact with one another, cooling and partially dehydrating said inert gas, passing said inert gas and the second stream of vaporized fuel to a zone of lower pressure, and mixing said inert gas and the second stream of vaporized fuel in the last mentioned zone.

6. A gas manufacturing method comprising flowing a paraffin hydrocarbon fuel having boiling points mainly below 34° F. through a vaporizing zone and therein vaporizing the same, dividing the vaporized flowing fuel leaving said zone into a first stream and a second stream, burning the first stream and thereby producing substantially inert gas and creating heat units, transferring said heat units to a circulating stream of a heating agent and passing the last mentioned stream through the vaporizing zone for vaporizing the first mentioned fuel while maintaining said inert gas and fuel out of contact with one another, cooling said inert gas, and then enriching said inert gas by mixing the second stream of vaporized fuel with the same.

GEORGE G. OBERFELL.
ROSSWELL W. THOMAS.